United States Patent [19]

Maesing et al.

[11] Patent Number: 5,687,989
[45] Date of Patent: Nov. 18, 1997

[54] IMPACT PROTECTION DEVICE FOR A MOTOR VEHICLE OCCUPANT

[75] Inventors: Alfons Maesing, Muehlacker; Herbert Boegge, Wiernsheim, both of Germany

[73] Assignee: Dr. Ing. h.c.F. Porsche AG, Germany

[21] Appl. No.: 694,798

[22] Filed: Aug. 9, 1996

Related U.S. Application Data

[63] Continuation of Ser. No. 401,687, Mar. 10, 1995, abandoned.

[30] Foreign Application Priority Data

Mar. 10, 1994 [DE] Germany ............... 44 08 037.9

[51] Int. Cl.⁶ .................................................. B60R 21/16
[52] U.S. Cl. .......................... 280/728.2; 280/732
[58] Field of Search ............... 280/728.1, 728.2, 280/732, 736, 740, 741

[56] References Cited

U.S. PATENT DOCUMENTS

| | | | |
|---|---|---|---|
| 3,625,543 | 12/1971 | Wolff | 280/740 |
| 3,708,179 | 1/1973 | Hulten | |
| 3,708,181 | 1/1973 | Mazelsky | 280/740 |
| 4,834,421 | 5/1989 | Korber | 280/728.2 |
| 4,925,209 | 5/1990 | Sakurai | 280/732 |
| 5,135,252 | 8/1992 | Suran et al. | 280/732 |
| 5,183,288 | 2/1993 | Inada et al. | |
| 5,217,253 | 6/1993 | Pray | 280/728.2 |
| 5,332,257 | 7/1994 | Rogers et al. | 280/728.2 |
| 5,342,090 | 8/1994 | Sobczak et al. | 280/732 |
| 5,348,339 | 9/1994 | Turner | 280/732 |
| 5,398,959 | 3/1995 | Avila | 280/732 |
| 5,425,549 | 6/1995 | Oda | 280/728.2 |
| 5,425,550 | 6/1995 | Paxton et al. | 280/732 |

FOREIGN PATENT DOCUMENTS

| | | |
|---|---|---|
| 0 358 230 A2 | 3/1990 | European Pat. Off. . |
| 0 405 908 A1 | 1/1991 | European Pat. Off. . |
| 0 415 362 A2 | 3/1991 | European Pat. Off. . |
| 0 517 414 A1 | 12/1992 | European Pat. Off. . |
| 2 043 255 | 3/1971 | Germany . |
| 2-249742 | 10/1990 | Japan ............... 280/728.2 |
| 5-4555 | 1/1993 | Japan ............... 280/728.2 |
| 5-286401 | 2/1993 | Japan . |
| 2 264 905 | 9/1993 | United Kingdom . |

*Primary Examiner*—Paul N. Dickson
*Attorney, Agent, or Firm*—Evenson, McKeown, Edwards & Lenahan, P.L.L.C.

[57] ABSTRACT

An impact protection device for an occupant of a motor vehicle comprises a prefabricated air bag module which is inserted into a recess of a dashboard and which essentially comprises a housing, a folded inflatable air bag and an inflating device. The air bag module is held in position by holders on a body-side transverse support, and the recess is closed on the side facing the occupant by a cover connected with the air bag module. To achieve a fast and low-cost mounting of the air bag module and of the cover in the vehicle and to be able to compensate mounting and manufacturing tolerances, the cover is swivellably connected with the air bag module and the air bag module, the cover and the holders form a prefabricated modular unit. The holders are pushed onto the transverse support and reach therearound in sections. Movable adjusting elements are arranged between the holders and the transverse support.

22 Claims, 4 Drawing Sheets

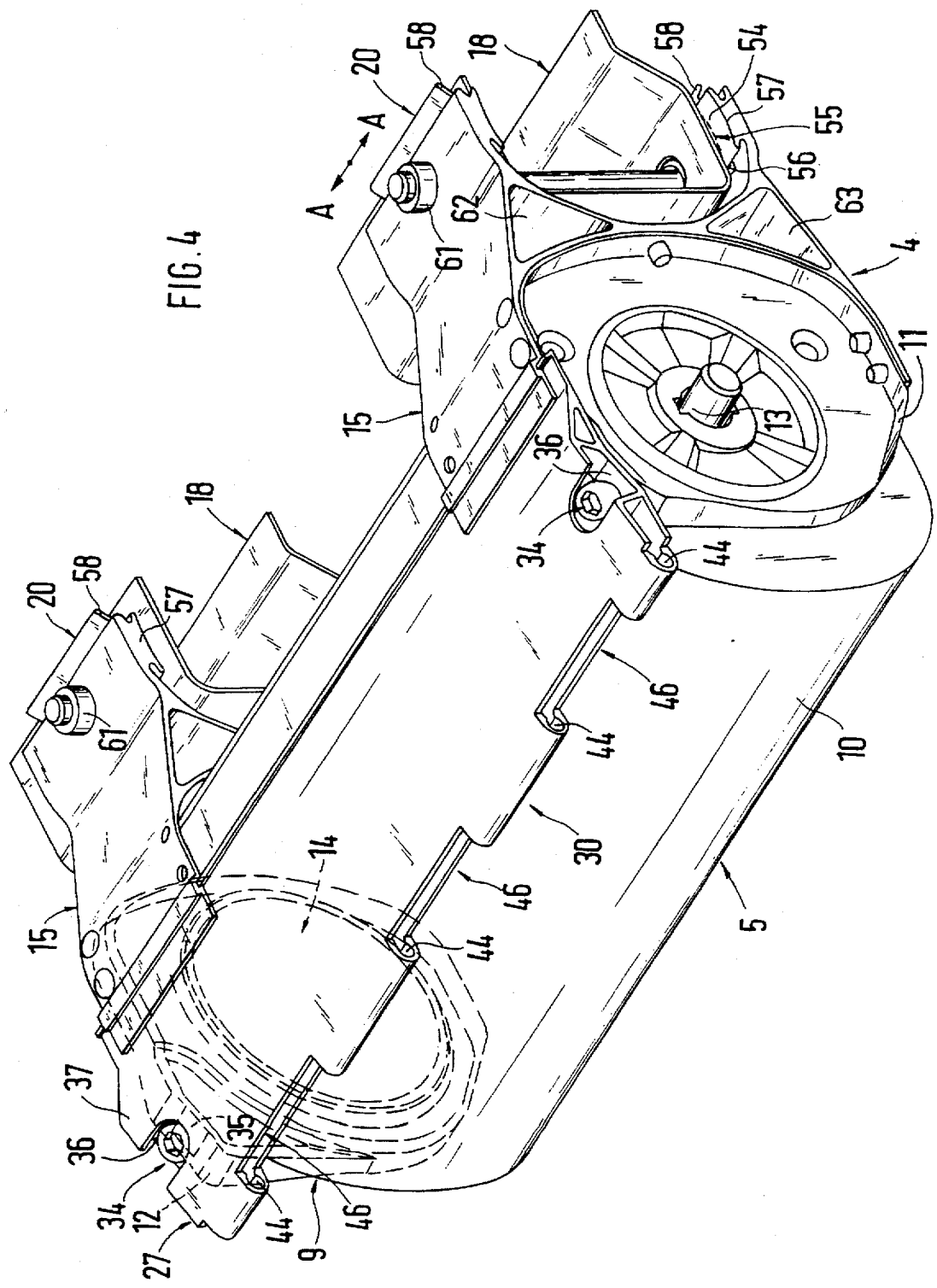

IMPACT PROTECTION DEVICE FOR A MOTOR VEHICLE OCCUPANT

This application is a continuation of application Ser. No. 08/401,687, filed on Mar. 10, 1995, abandoned.

BACKGROUND AND SUMMARY OF THE INVENTION

The present invention relates to an impact protection device for an occupant of a motor vehicle and, more particularly, to an impact protection device comprising a prefabricated air bag module configured to be insertable into a recess of a dashboard and having a housing, a folded inflatable air bag and an inflating device for the air bag, holders for holding the air bag module in position on a body-side transverse support, and, on a side facing the occupant, a cover closing the recess and being swivellable connected with the air bag module.

In a known type of impact protection device as shown in EP 0 415 362 A2, a prefabricated air bag module comprising a housing, a folded inflatable air bag and an inflating device is screwed to two holders welded to a transverse support. After insertion and fastening of the air bag module, in another operation, the two-part cover for closing the recess of the dashboard is mounted for which additional holders are provided on the housing.

The separate mounting of the air bag module and the cover causes, however, considerable time and cost expenditures. In addition, the cover must be carefully adjusted on the housing of the air bag module so that a constant course of the joint between the cover and the dashboard is obtained.

It is an object of the present invention to provide an improved impact protection device such that the device can be mounted rapidly in the vehicle and at low cost, and that mounting and manufacturing tolerances can be compensated during the mounting in a simple manner.

This object has been achieved according to the present invention by providing that the air bag module, the cover and the holders mounted on the air bag module form a prefabricated modular unit, the holders being configured to be pushed onto the transverse support and reaching therearound in sections, and movable adjusting elements are arranged between the holders and the transverse support.

Among the principal advantages achieved with the present invention are that, as a result of the swivellable connection of the air bag module and the cover and because of the holders arranged on the air bag module, a prefabricated component is provided which is rapidly and simply inserted into the recess of the dashboard, is pushed onto the transverse support by way of the holders mounted on the air bag module and is automatically adjusted by the adjusting elements provided on the holder.

The holders, the adjusting elements and the transversely extending profile rail are formed by extruded profile parts made of a light metal alloy and can be manufactured in a simple and low cost manner. The adjusting elements, which interact with the holder by way of transversely extending, dovetail-like guides, allow the air bag module to be moved to a defined extent in the transverse direction and, in addition, to be swivelled by a certain amount in the vertical direction because the receiving devices of the adjusting elements and the corresponding foot sections of the holder have a curved construction.

Although the adjusting elements can be moved, they are connected with the foot sections of the holder in a captive manner. In addition, viewed in the longitudinal direction, the foot sections of the holder have a narrower construction than the receiving devices on the adjusting elements.

A supporting tube mounted inside the console is used for stiffening the console and houses the fastening screw.

BRIEF DESCRIPTION OF THE DRAWINGS

These and other objects, features and advantages of the present invention will become more readily apparent from the following detailed description when taken in conjunction with the accompanying drawings wherein:

FIG. 4 is a perspective view of an impact protection device in the direction of the arrow R of FIG. 3 without the cover and the body-side transverse support.

DETAILED DESCRIPTION OF THE DRAWINGS

Figure 1:
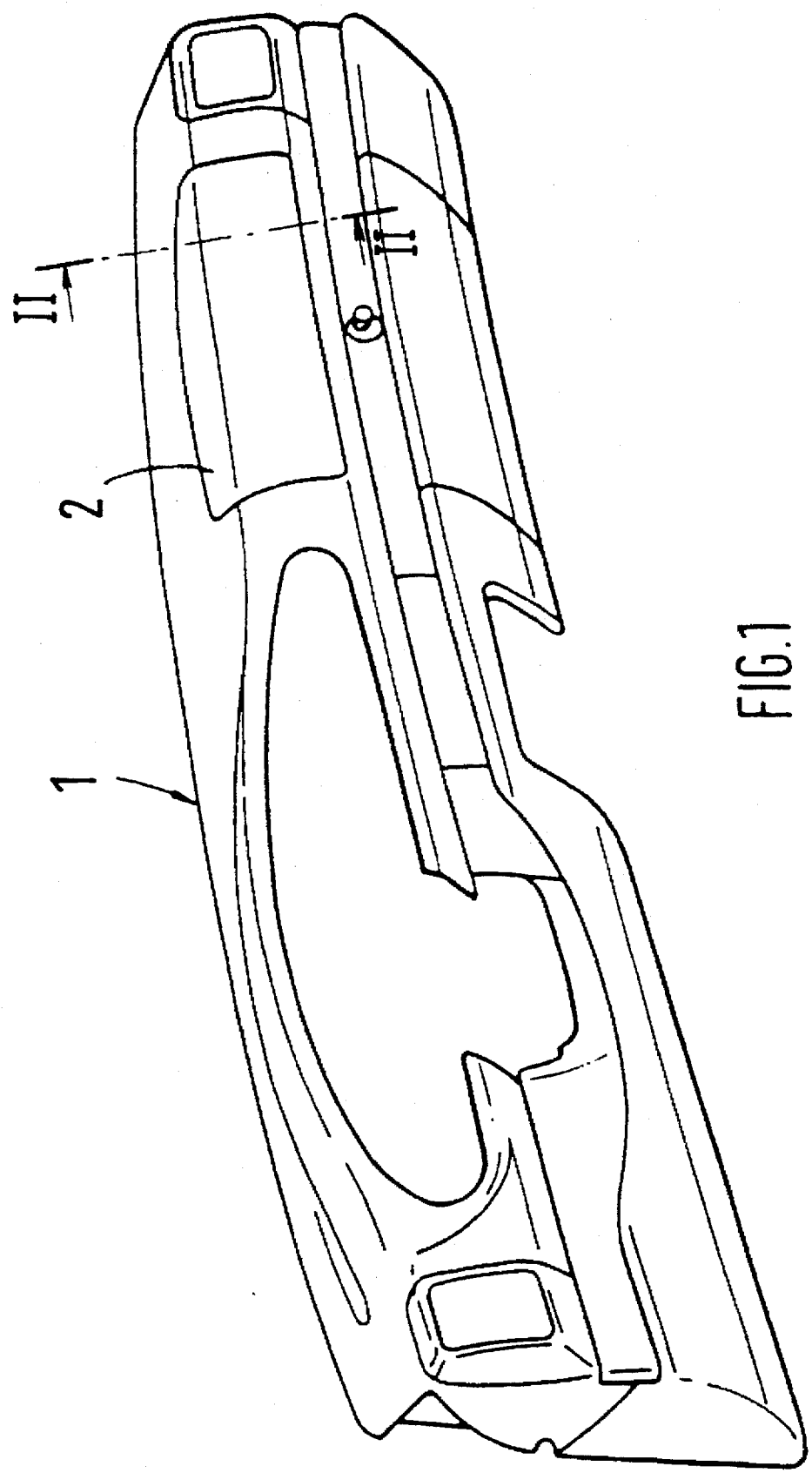
FIG. 1 is a perspective view from the passenger compartment onto a dashboard with an impact protection device for an occupant.

On the front passenger side, the dashboard illustrated in FIG. 1 and designated generally by numeral 1 has a recess 3 which can be closed by a cover 2 and in which an impact protection device 4 (e.g., air bag) is arranged for a motor vehicle occupant. The impact protection device 4 (FIG. 2) comprises an air bag module 5 assembled outside the vehicle into a preassembled operable modular unit. The air bag module designated generally by numeral 5 essentially comprises a housing 6, an inflatable air bag 7 and an inflating device 8 (FIG. 3).

In the illustrated embodiment, the inflating device 8 is formed by a tube generator which is slid in through an open side 9 of the tube-shaped housing 6. In a manner not shown in detail, the folded air bag 7 extends by way of a holding section around the housing 6 and is covered by a flexible cover 10. Releasable locking devices (not shown in detail), are of a known general type and are provided locally on the flexible covering 10. The locking devices open up automatically when the air bag 7 unfolds so that the air bag 7 can be moved into its inflated operating position. The air bag module 5 also comprises two lateral cover parts 11, 12.

The inflating device 8 is non-rotatably held in a slot opening 13 on the cover part 11, while the other cover part 12 has a cylindrical recess 14 for the inflating device 8 to extend therethrough.

By way of two holders 15 which, as viewed in the transverse direction, are spaced from one another, the air bag module 5 is fastened to a vehicle-body-side transverse support 16 formed by a supporting tube 17 which extends approximately at the level of the recess 3 and which, as viewed in the longitudinal direction of the vehicle, extends between a front wall of the body and the dashboard 1 and is connected by way of plate-shaped end regions to upright columns of the vehicle (not shown in further detail).

The two holders 15 are arranged on laterally exterior areas of the air bag module 5. In the area of the holders 15 fastened to the air bag module 5, two consoles 18 respectively are mounted on the supporting tube 17 and are formed by profiled pressed sheet metal parts. The consoles 18 are welded to the supporting tube 17 and are slightly wider than the holders 15. According to the present invention, the cover 2 closing the recess 3 is swivellably connected with the air bag module 5, with the air bag module 5, the cover 2 and the holders 15 forming a prefabricated modular unit 19.

During the mounting of the modular unit 19, the holders 15 are pushed into the transverse support 16 and reach therearound in sections. Between the holders 15 and the transverse support 16, movable adjusting elements 20 are arranged which ensure a relative movement between the modular unit 19 and the adjusting element 20 or the transverse support 16.

Figure 2:
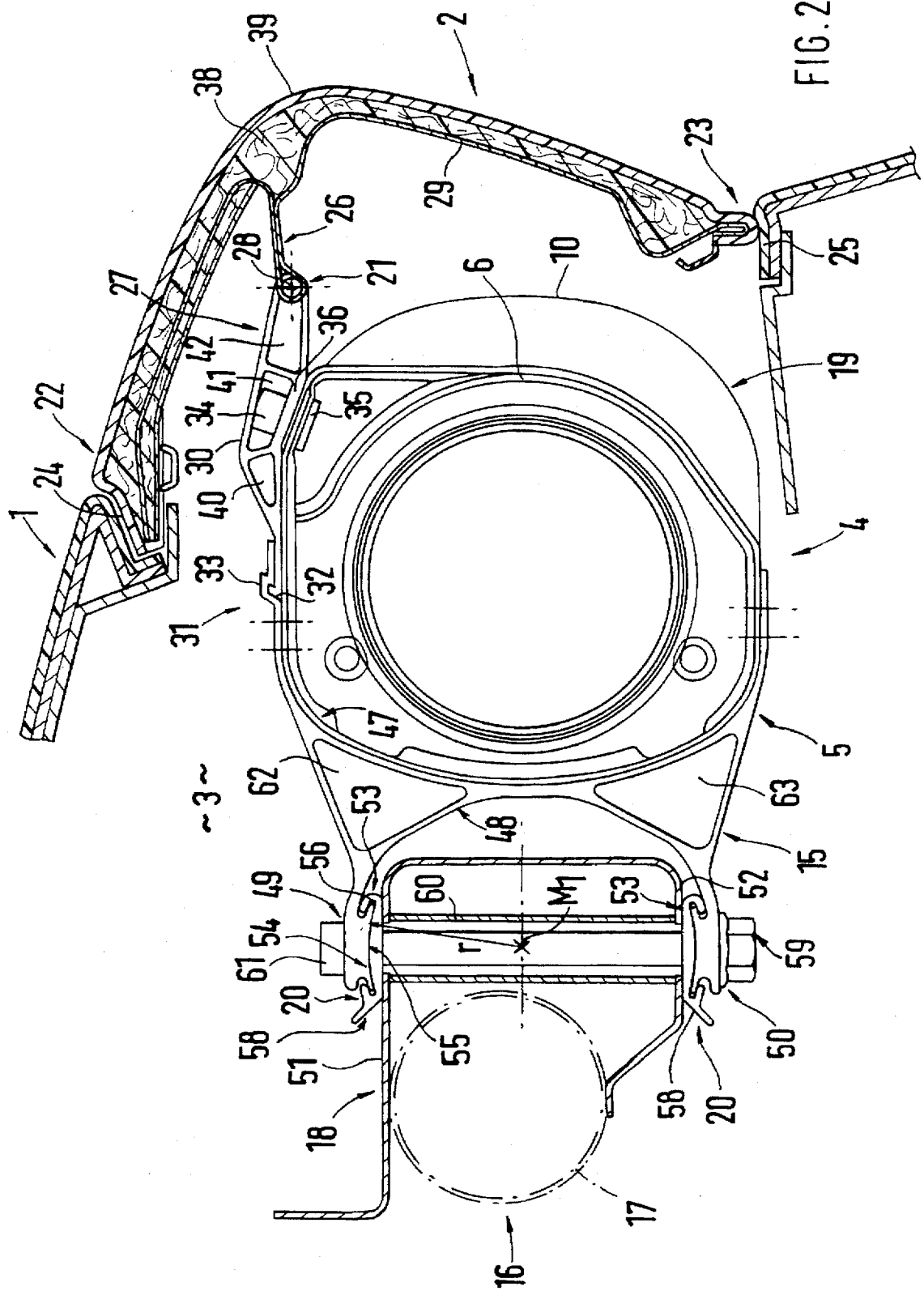
FIG. 2 is an enlarged sectional view along line II—II of FIG. 1.
Figure 3:
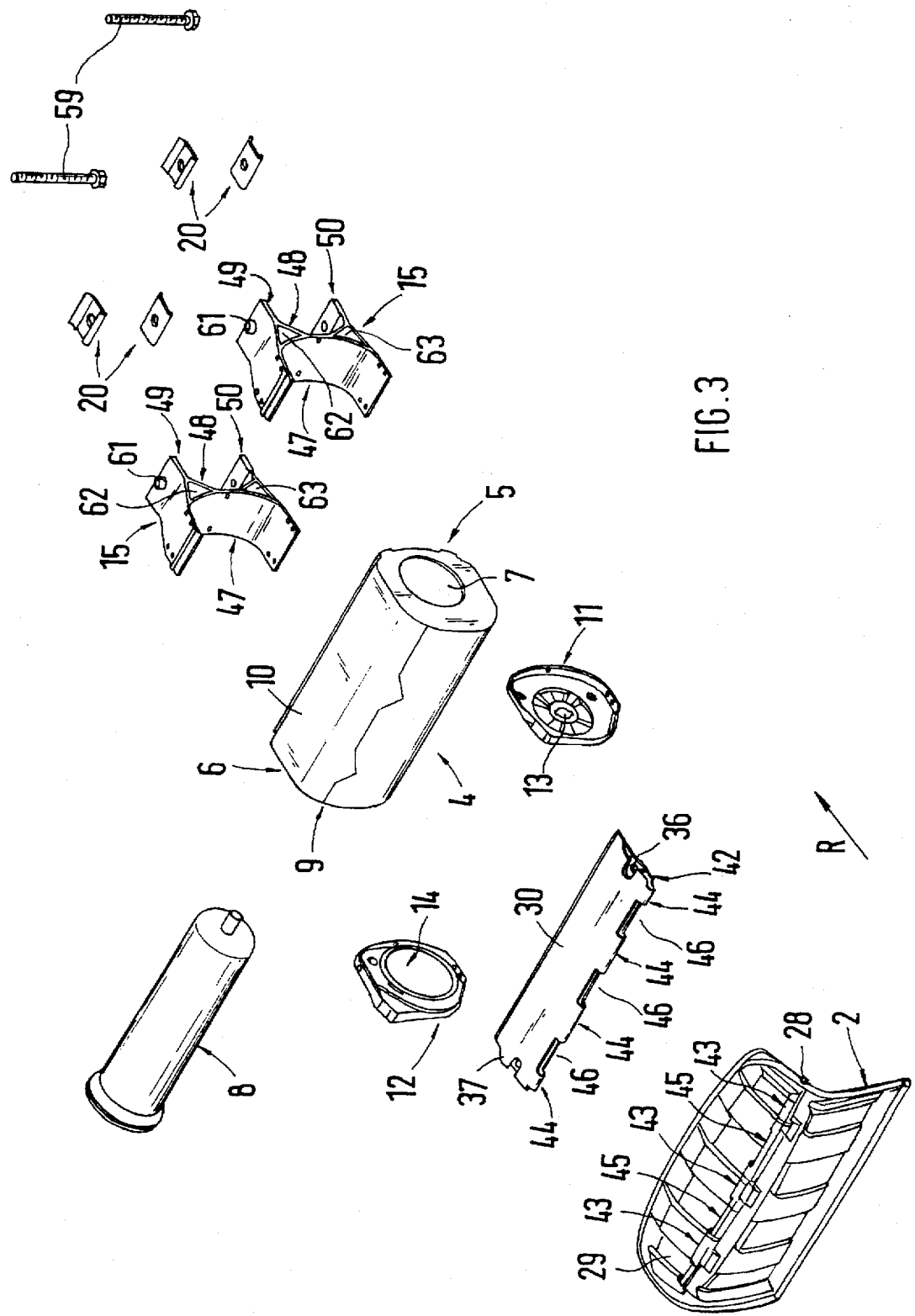
FIG. 3 is an exploded view of the essential components of an air bag arrangement and of the cover in accordance with the present invention.

The cover 2 is connected with the air bag module 5 only by way of a transversely extending, approximately horizontally aligned hinge 21 as seen in FIG. 2. The hinge 21 is arranged away from an upper edge area 22 and a lower edge area 23 of the cover 2, and extends approximately at the level of the upper edge of the air bag module 5. The hinge 21 comprises hinge arms 26, 27 and a transversely extending, approximately horizontally aligned hinge pin 28.

The approximately horizontally aligned upper edge area 22 of the cover 2 tapers in the direction of the dashboard 1 and is accommodated in a centering manner in a corresponding transversely extending groove 24 of the dashboard 1. The lower edge area 23 of the cover 2 rests on a wall section 25 of the dashboard 1 which extends approximately at a right angle with respect to the cover 2.

The cover-side hinge arm 26 is constructed in one piece with a support plate 29 of the cover 2, and the hinge arm 27 fastened to the air bag module 5 is formed by a transversely extending, approximately horizontally directed profile rail 30 which is fixedly connected with the lateral cover parts 11, 12 and the two holders 15. Between the profile rail 30 and each holder 15, a form-locking connection 31 is provided, in which case an upward-directed, diagonally extending web 32 of the profile rail 30 engages in a groove 33 of the holder 15 disposed above it as seen in FIG. 2. The profile rail 30 is connected on both lateral ends by way of one screw 34, respectively, with the cover part 11, 12 situated therebelow. The screws 34 are screwed from above into threaded nuts 35 of the cover parts 11, 12, and the screw head rests on a lower wall 36 of the profile rail 30. The upper wall 37 of the profile rail 30 is locally recessed in the area of the screws 34.

The cover 2 comprises the support part 29, a foam layer 38 and a cover layer 39. The profile rail 30 has several adjoining, transversely extending hollow profile sections 40, 41, 42.

Alternatively, receiving devices 43, 44 and recessed areas 45, 46 are provided on the cover 2 and on the hollow profile section 42 of the profile rail 30, in which case the transversely extending hinge pin 28 extends through the receiving devices 43, 44 of the cover 2 and of the profile rail 30.

Each holder 15 has a first receiving section 47 which form-lockingly reaches around a partial area of the air bag module 5. In the area of the first receiving section 47, the holder 15 is fixedly connected by screws or rivets with the adjacent cover part 11 and 12. In addition, on the side facing away from the air bag module 5, each holder 15 has a second receiving section 48 which reaches in sections around the transverse support 16. The movable adjusting elements 20 are arranged on opposite end regions 49, 50 of the second receiving section 48 and are supported on the contact surfaces 51, 52 of the transverse support 16.

The contact surfaces 51, 52 can be constructed either directly on the transverse support 16 or, as in the embodiment, on the consoles 18. According to FIG. 2, the contact surfaces 51, 52 are parallel to one another and extend approximately horizontally. Between the two receiving sections 47, 48, approximately triangular, hollow-chamber-type supporting sections 62, 63 which are disposed above one another are provided on the holder 15.

By way of transversely extending, dovetail-type guides 53, the adjusting elements 20 interact with the upper end regions 49 and the lower end regions 50 of the second receiving sections 48 of the holders 15. The adjusting elements 20 are mounted on the holders 15 to be movable relative thereto. The adjusting elements 20 have a smaller width than the holders 15 and the consoles 18. Furthermore, the adjusting elements 20 can be moved by a defined amount in the transverse direction A—A with respect to the holders 15 and are additionally secured against a lateral dropping.

On the side facing the holder 15, each adjusting element 20 has a transversely extending receiving device 54 with a bottom 55 and two lateral receiving grooves 56. The receiving device 54 is in a slidably operative connection with a correspondingly constructed foot section 57 of the adjoining end region 49, 50 of the second receiving section 48. The foot section 57 engages in the receiving device 54 and has a narrower construction than the receiving device 54.

By way of the curved design of the bottom 55 of the receiving device 54 and of the corresponding foot section 57 of the holder 15, a defined swivel movement of the air bag module 5 and of the holder 15 fastened thereto is ensured about an axis of rotation formed by the hinge pin 28 so that a relative movement is obtained in the vertical direction with respect to the stationary transverse support 16. As seen in FIG. 2, the bottom 55 and the side of the foot section 57 facing the bottom 55 are constructed in a radius-shape, i.e. radius r in center point M1. On the side facing the console 18, the adjusting elements 20 each have a diagonally extending inserting web 58, the sliding of the holders 15 onto the consoles 18 being facilitated by the opposite inserting webs 58.

For the fastening of the prefabricated modular unit 19 on the transverse support 16, an upright fastening screw 59 is provided in the area of each holder 15. The fastening screw 59 is guided from below through openings of the holder 15, of the adjusting elements 20, of the consoles 18 and through a supporting tube 60 arranged inside the console 18, and is screwed into a threaded nut 61 mounted on the top side of the holder 15. The threaded nut 61 is constructed as a weld nut or as an insert nut. The holder 15, the profile rail 30 and the adjusting elements 20 are preferably formed by extruded profile parts made of a light metal alloy.

When the air bag is triggered, only the upright section of the cover 2 situated below the hinge 21 is swivelled upward by the inflated air bag 7, whereas the upper edge area 22 of the cover 2 remains in an engagement with the corresponding groove 24 of the dashboard 1.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Impact protection device for an occupant of a motor vehicle, comprising a prefabricated air bag module configured to be insertable into a recess of a dashboard and having a housing, a folded inflatable air bag and an inflating device for the air bag, holders mounted on the air bag module and having opposed contact surfaces configured to allow the air bag module to be pushed toward and onto a body-side transverse support of the vehicle as the air bag module is inserted into the recess and held in position thereon, and, on a side facing the occupant, a cover closing the recess and being swivellably connected with the air bag module, wherein the air bag module, the cover and the holders mounted on the air bag module are assembled in alignment with each other so as to be aligned between the recess and the transverse support and to form a prefabricated modular unit, the opposed contact surfaces of the holders are operatively associated with spaced movable adjusting elements to compensate for tolerances between the holders and the transverse support, and an edge area of the cover is configured to be received in a groove on the dashboard such that the cover is held in a predetermined installed position upon completion of insertion of the air bag module into the recess.

2. The impact protection device according to claim 1, wherein the cover is connected with the air bag module only by a transversely extending, approximately horizontally aligned hinge.

3. The impact protection device according to claim 2, wherein the hinge is located away from upper and lower edge areas of the cover approximately at a level of an upper edge of the air bag module.

4. The impact protection device according to claim 3, wherein the upper edge area of the cover, which tapers toward the dashboard, is configured to be centeringly received in a corresponding, transversely extending groove of the dashboard, and the lower edge area of the cover is configured to rest on a wall section of the dashboard which extends approximately at a right angle thereto.

5. The impact protection device according to claim 2, wherein the hinge has a cover-side hinge arm constructed integrally with a support plate of the cover, and a hinge arm fastened to the air bag module comprises a transversely extending profile rail connected with lateral cover parts and the holders.

6. The impact protection device according to claim 5, wherein the hinge is located away from upper and lower edge areas of the cover approximately at a level of an upper edge of the air bag module.

7. The impact protection device according to claim 5, wherein the profile rail comprises several adjoining hollow profile sections extending in a direction transverse to a vehicle longitudinal direction, and receiving devices and recessed areas are alternatively provided on the profile rail and on the cover, with a transversely extending hinge pin extending through the receiving devices of the cover and of the profile rail.

8. The impact protection device according to claim 1, wherein each holder has a first receiving section configured to form-lockingly reach around a partial area of the air bag module, and each holder is fixedly connected in an area of the first receiving section with an adjoining lateral cover part.

9. The impact protection device according to claim 8, wherein each holder has, on a side facing away from the air bag module, a second receiving section configured to reach in sections around the transverse support, with the movable adjusting elements being arranged on opposite end regions of the second receiving section and being supported on contact surfaces of the transverse support.

10. The impact protection device according to claim 9, wherein the adjusting elements cooperate, via transversely extending, dovetail guides, with upper and lower end regions of the second receiving section of the holder, with the adjusting elements being movably mounted on and relative to the holder.

11. The impact protection device according to claim 9, wherein, on a side facing the holder, each adjusting element has a transversely extending receiving device with a curved bottom and two lateral receiving grooves therebelow, which receiving device is operatively connected with a correspondingly constructed foot section of the adjacent end region of the second receiving section, the foot section being configured narrower than the receiving device, and means for obtaining a defined swivel movement of the air bag module, whereby, as a result of the curved configuration of the foot section and the bottom, the defined swivel movement of the air bag module is obtainable relative to the transverse support.

12. The impact protection device according to claim 1, wherein projecting consoles are mounted in an area of the holders and have parallel upper and lower contact surfaces on which the adjusting elements rest, and an upright fastening screw is arranged to extend from below through openings of the holders, of the adjusting elements, of the consoles and through a supporting tube arranged inside each console, the fastening screw being screwed into a threaded nut mounted on the top side of the holders for fastening of the prefabricated modular unit on the transverse support in an area of each holders.

13. The impact protection device according to claim 12, wherein the cover is connected with the air bag module only by a transversely extending, approximately horizontally aligned hinge.

14. The impact protection device according to claim 13, wherein the hinge is located away from upper and lower edge areas of the cover approximately at a level of an upper edge of the air bag module.

15. The impact protection device according to claim 14, wherein the upper edge area of the cover, which tapers toward the dashboard, is configured to be centeringly received in a corresponding, transversely extending groove of the dashboard, and the lower edge area of the cover is configured to rest on a wall section of the dashboard which extends approximately at a right angle thereto.

16. The impact protection device according to claim 15, wherein the hinge has a cover-side hinge arm constructed integrally with a support plate of the cover, and a hinge arm fastened to the air bag module comprises a transversely extending profile rail connected with lateral cover parts and the holders.

17. The impact protection device according to claim 16, wherein the profile rail comprises several adjoining hollow profile sections extending in a direction transverse to a vehicle longitudinal direction, and receiving devices and recessed areas are alternatively provided on the profile rail and on the cover, with a transversely extending hinge pin extending through the receiving devices of the cover and of the profile rail.

18. The impact protection device according to claim 17, wherein each holder has a first receiving section configured to form-lockingly reach around a partial area of the air bag module, and each holder is fixedly connected in an area of the first receiving section with the adjoining lateral cover part.

19. The impact protection device according to claim 18, wherein each holder has, on a side facing away from the air bag module, a second receiving section configured to reach in sections around the transverse support, with the movable adjusting elements being arranged on opposite end regions of the second receiving section and being supported on contact surfaces of the transverse support.

20. The impact protection device according to claim 16, wherein at least one of the holders, the profile rail and the adjusting elements comprise light metal alloy extruded profile parts.

21. The impact protection device according to claim 1, wherein the transverse support comprises a supporting tube operatively connected on two exterior ends thereof to upright columns of a motor vehicle body, and projecting consoles are mounted in an area of the holders of the air bag module and have parallel upper and lower contact surfaces, on which the adjusting elements rest.

22. The impact protection device according to claim 1, wherein the adjusting elements are configured to be movable by a defined amount in a transverse direction relative to the holders and to be secured against a lateral dropping.

* * * * *